US 6,631,584 B1
(12) United States Patent
Seinsevin
(10) Patent No.: US 6,631,584 B1
(45) Date of Patent: *Oct. 14, 2003

(54) METHOD FOR GROWING TRAINED VINES AND DEVICE THEREFOR

(76) Inventor: Daniel Seinsevin, La Garenne, Saint Vincent de Pertignas (FR), 33420

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 162 days.

(21) Appl. No.: 08/983,383
(22) PCT Filed: Jul. 17, 1996
(86) PCT No.: PCT/FR96/01121
§ 371 (c)(1), (2), (4) Date: May 21, 1998
(87) PCT Pub. No.: WO97/03553
PCT Pub. Date: Feb. 6, 1997

(30) Foreign Application Priority Data

Jul. 17, 1995 (FR) .............................. 95 08828
Oct. 5, 1995 (FR) .............................. 95 11953

(51) Int. Cl.[7] ..................... A01G 17/04; A01G 13/02
(52) U.S. Cl. ......................... 47/44; 47/46; 47/20.1
(58) Field of Search ..................... 47/44, 46, 45, 47/47, 26, 28.1, 20, 2, 58.1, 29

(56) References Cited

U.S. PATENT DOCUMENTS

| | | | | |
|---|---|---|---|---|
| 542,821 A | * | 7/1895 | Broughton et al. | ............ 47/44 |
| 1,192,890 A | * | 8/1916 | Gulick | ........................ 47/28.1 |
| 1,749,068 A | * | 3/1930 | De Land | ................ 47/1.01 R |
| 1,930,939 A | * | 10/1933 | Horner | ............................. 47/9 |
| 2,842,898 A | * | 7/1958 | Buckles | .......................... 47/46 |
| 3,160,986 A | | 12/1964 | Watson et al. | ................. 47/56 |
| 4,044,501 A | | 8/1977 | Frydryk | ......................... 47/26 |
| 4,798,023 A | | 1/1989 | Morssinkhof et al. | ......... 47/26 |
| 5,519,965 A | * | 5/1996 | Robinson | ....................... 47/31 |

FOREIGN PATENT DOCUMENTS

| | | | | |
|---|---|---|---|---|
| CH | 423339 | | 6/1965 | |
| DE | 513575 | | 10/1971 | |
| FR | 456176 | * | 3/1913 | .................... 47/26 |
| FR | 2271764 | | 5/1974 | |
| FR | 2281717 | | 3/1976 | |

(List continued on next page.)

OTHER PUBLICATIONS

Published PCT Application.
PCT Filing Forms.
Official Filing Receipt.
Demand for Preliminary Examination.
Preliminary Report.
Written Opinion from European Patent Office.

*Primary Examiner*—Son T. Nguyen
(74) *Attorney, Agent, or Firm*—Baker Botts LLP

(57) ABSTRACT

A method of growing vines trained in rows, particularly for the purposes of avoiding frost damage and promoting good fruiting, the method being of the type consisting in draping a film (8) of plastics material over each row of vines, the film being supported firstly by at least one top wire (2) situated at the tops of a row of stakes (1), and secondly by spreader elements (5, 7) for spreading the two panels of the film (8), the film being held by fasteners (9) that are secured at intervals to the bottom edges (11) thereof and that are connected to fastener members (12, 13) that are preferably situated on said stakes. Said bottom edges (11) of the film (8) are disposed substantially level with and preferably slightly beneath the lowest height at which side shoots (V) develop, leaving a wide opening between the edges (11) that enables air to circulate because the lateral portions of the film situated above the spreader elements (5, 7) are provided with orifices (14) enabling the vines inside the film to be ventilated, which film is put into place shortly before new growth starts and is left in place at least until frost is no longer a threat.

21 Claims, 4 Drawing Sheets

FOREIGN PATENT DOCUMENTS

| | | | |
|---|---|---|---|
| FR | 2678805 | | 7/1991 |
| FR | 2724815 | | 9/1994 |
| GB | 250 | * | 1/1857 .................... 47/26 |
| RU | 895357 | | 1/1982 |
| SU | 1738148 | * | 6/1992 .................... 47/44 |
| SU | 1818008 | * | 5/1993 ................ 47/26 R |

* cited by examiner

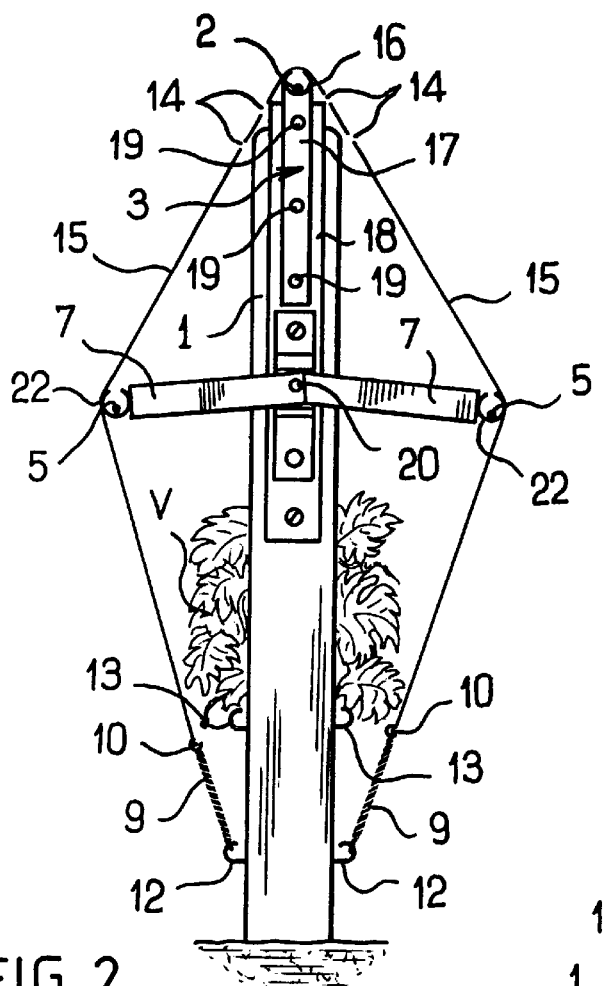
FIG_2
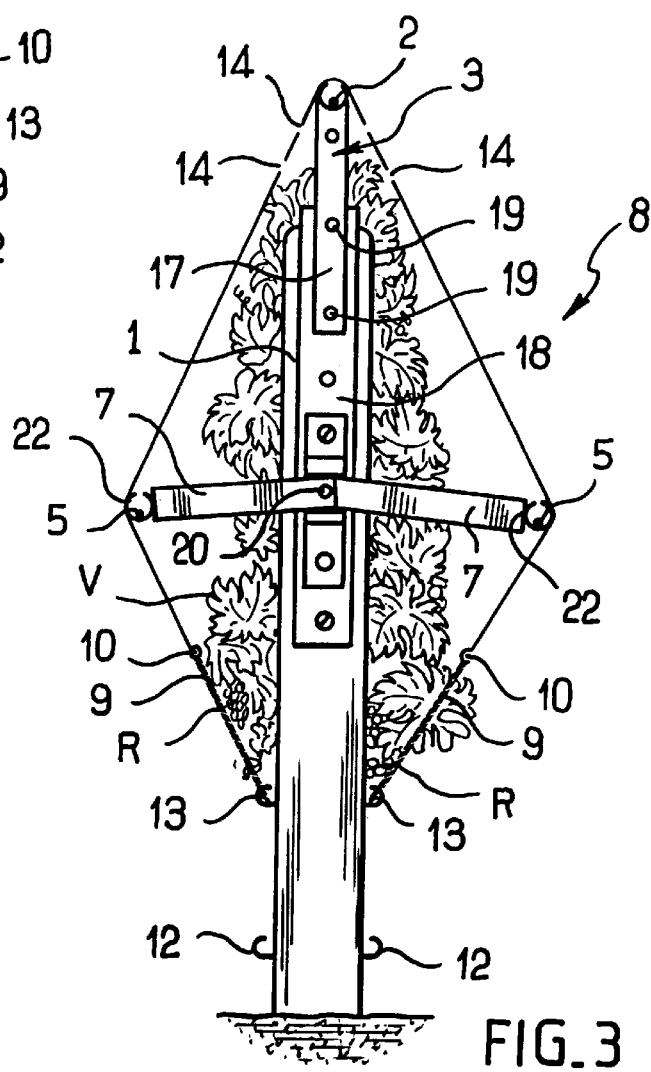
FIG_3

METHOD FOR GROWING TRAINED VINES AND DEVICE THEREFOR

The present invention relates to growing vines trained in rows, and more particularly to a growing method intended specifically to avoid frost damage and to promote good fruiting.

DESCRIPTION OF RELATED ART

A known growing method consists in covering the rows of vines in waterproof film of plastics material draped over support wires extending between stakes, the film forming a tunnel that operates by the greenhouse effect to keep the temperature of the vines above the temperature at which buds are destroyed by frost. That method of growing does not provide complete satisfaction.

It has been observed that the greenhouse effect is liable to subject the vines, on sunny days, to excessive temperatures capable of having an unfavorable influence on the quality of the wine produced, and in particular having the effect of reducing the richness of its aromas.

SUMMARY OF THE INVENTION

The invention seeks to avoid various difficulties that are encountered in growing vines, but without thereby spoiling the quality of the resulting wine.

The invention achieves this by a method of growing vines trained in rows, the method serving in particular to avoid frost damage and to promote good fruiting, the method being of the type consisting in draping a film of plastics material over each row of vines, the film being supported firstly by at least one top wire situated at the top of a row of stakes, and secondly by spreader elements for spreading the two panels of the film, the film being held by fasteners secured at intervals to the bottom edges of the film and connected to fastener members preferably situated on said stakes, the method being characterized by the fact that said bottom edges of the film are disposed substantially level with and preferably slightly below the lowest height at which side shoots develop, while leaving between said edges a large opening allowing air to flow because the side portions of the film situated above the spreader elements are provided with orifices enabling the vines inside the film to be ventilated, which film is put into place shortly before new growth starts and is left in place at least until the end of any risk of frost.

By means of the invention, in spite of the vines being ventilated via said orifices, the consequences of spring frosts are avoided or greatly limited, which frosts would otherwise usually run the risk of occurring at the moment when new growth starts.

According to the invention, the film is preferably left in place until after the fruiting period so as to enable fruiting to take place under favorable circumstances.

Preferably, a film is used whose top portion possesses orifices having a total area that corresponds to a value lying in the range 100 cm$^2$ to 1000 cm$^2$ per linear meter of film, and that preferably lies in the range 200 cm$^2$ to 500 cm$^2$ per linear meter of film.

Preferably, the orifices are situated in each of the panels of the film.

To facilitate ripening of the grapes, after the vines have been grown to the beginning of ripening, the above-mentioned film is preferably placed on the top wire of the row of vines, the wire being raised so as to be situated above the leaves of the vines, the film resting laterally on said spreader elements, and being held via its bottom edges by said fasteners, the bottom edges of the film being at a level situated above the grapes, and the film is removed immediately before vintaging.

In a particular implementation of the method of the invention, a plastics film is extended on the ground between the rows of vines to remove water to the ends of the rows to avoid the water penetrating into the ground.

Surprisingly, it has been observed that vines provided with a film of the invention are much less sensitive to frost and, for example, can withstand temperatures of −3° C., even though the temperature of the air in the vicinity of the vegetation under the film is only 1° C. higher than the outside ambient temperature.

Most surprisingly, the invention also makes it possible to improve fruiting by avoiding the phenomena known as "abortion" and "uneven ripening" which correspond to the fact of a greater or lesser fraction of the vine flowers failing to set seed, or to the fact that the flowers set seed in a manner that is highly staggered over time which leads at vintaging time to bunches containing some grapes that are over-ripe while other grapes are still not yet ripe.

Tests performed by the Applicant have shown that implementing the method of the invention ensures fruiting of vines that is particularly regular and complete, even under climatic conditions that are not very favorable.

Implementing the method of the invention also has the advantage of considerably reducing requirements concerning the amount of treatment against the various diseases of the vine that turns out to be necessary. In particular, it has been found that a single fungicidal treatment prior to installation of the film suffices, and no further treatment is needed until the film is removed, e.g. at the end of May or the beginning of June which, independently of any ecological advantages, constitutes a very considerable saving in pesticide and labor costs.

The method of the invention also has the advantage of ensuring that vines grow more regularly and of causing the growth cycle thereof to be advanced by at least eight to ten days, thereby making it possible to pick earlier and thus generally under weather conditions that are better, which can be particularly advantageous for late varieties of grape.

Using the same films and the same support devices, the method of the invention makes it possible to avoid subjecting grapes that are maturing to sometimes heavy rain that can lead to the drawbacks both of reducing alcohol content and of encouraging rotting by excess moisture and some of the grapes bursting.

The invention also provides apparatus for implementing the above-specified method.

In a particular embodiment, the apparatus comprises strips of film for draping over the rows of vines, the strips being provided along their length and in the middle region thereof with orifices, spreader elements for holding the two panels of film apart, fasteners for holding the film via its bottom edges, and adjustable height support means for supporting the top wire that extends between the stakes in a row of vines.

In a particular embodiment, the apparatus further includes strips of film for placing on the ground between the rows of vines to remove rain water to the ends of the

BRIEF DESCRIPTION OF THE DRAWINGS

The invention will be better understood on reading the following detailed description of a non-limiting implementation of the method of the invention, and on examining the accompanying drawings, in which:

FIGS. 2 and 3 are two front views showing the configuration of the film during two different steps of the growing method of the invention;

DERAILED DESCRIPTION OF THE INVENTION

Figure 1:
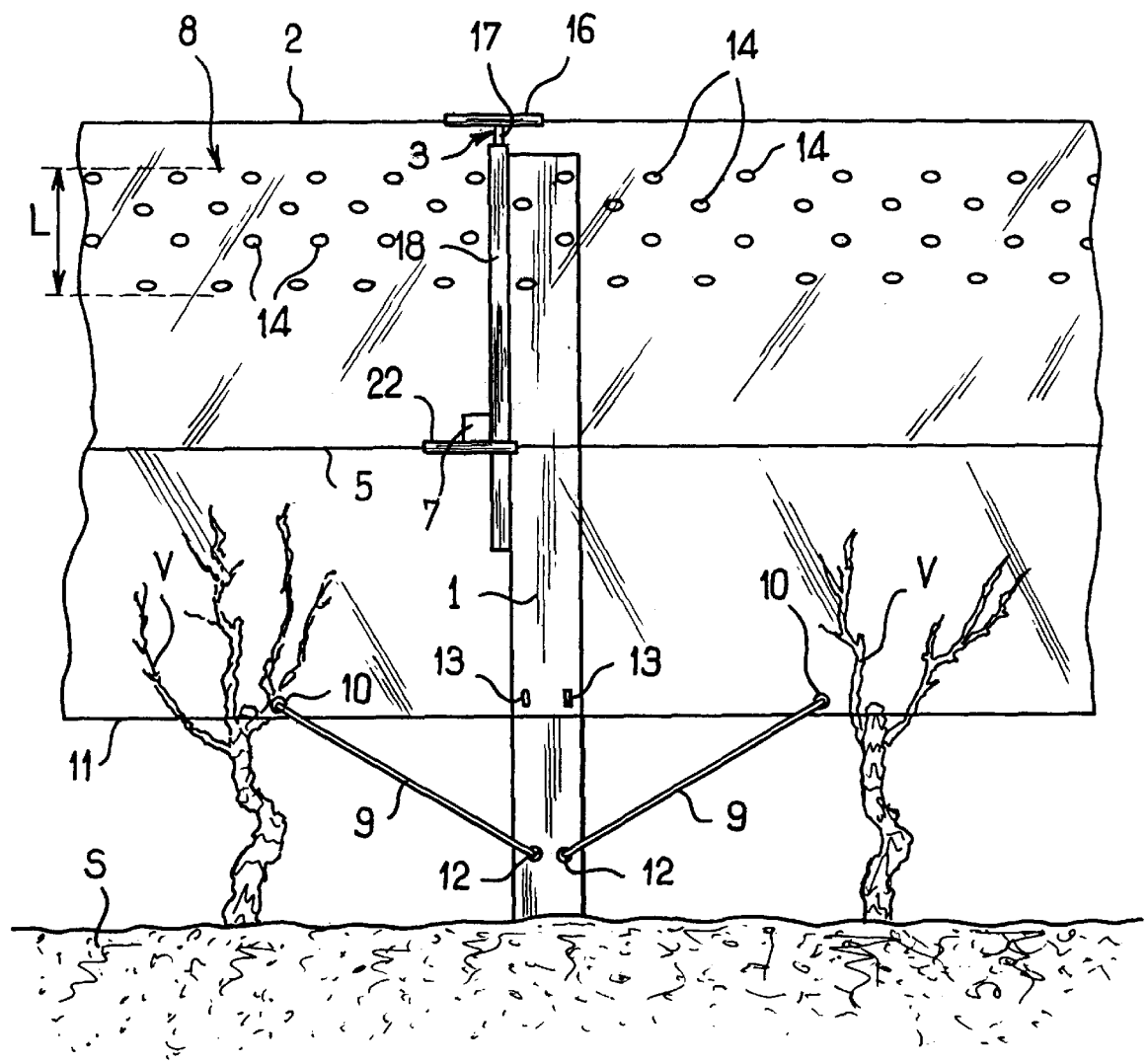
FIG. 1 is a diagrammatic side view showing a row of vines covered in a film in one of the steps of the growing method of the invention.

FIG. 1 is a diagrammatic lateral elevation showing a row of trained vines. The vine plants V are placed in a row between stakes 1, e.g. at a rate of four plants between adjacent pairs of stakes 1.

As an indication, the stakes 1 may stand 1.5 meters (m) high above the ground S.

Support wires, three wires in the example described, interconnect the stakes 1 in the same row of vines.

More particularly, there can be seen in FIGS. 1 to 3, a top wire 2 that is secured to the top ends of support means 3 that are adjustable in height and fixed to each of the stakes 1, and two lateral wires 5 that are held on spreader arms 7. The arms 7 are hinged on a pivot 20 and, when deployed as shown in FIGS. 2 and 3, they extend in a plane that is substantially perpendicular to the wires 2 and 5. By way of example, the arms 7 are fixed at about two-thirds the height of the stake 1.

It would not go beyond the ambit of the invention to use a plurality of spaced-apart parallel wires at the top of the stakes instead of using a single top wire 2.

A film 8 of transparent or translucent plastics material is draped over each row of vines and rests on the wires 2 and 5.

As an indication, in the example described, the film is constituted by a polyethylene sheet that is about 180 μm thick, and its width may be 1.6 m, 2 m or 2.4 m, for example.

The middle region of the film 8 rests on the top wire 2, and it is held in place by elastic straps 9 of the extensible rubber (bungee) type which are connected at intervals to the bottom edges 11 of the film. One end of each strap 9 is hooked to an eyelet 10 in the film 8 or any other fastening means such as cords engaged in hems of the film, while the other end of each strap is fixed to hooks secured to the stakes.

By way of example, FIGS. 1 to 3 show hooks 12 and 13 for connecting to the straps 9. The hooks are fixed at two different heights on the bottom portion of a stake 1 to enable different configurations to be given to the film 8, as described below.

In the embodiment described, the lateral portions 15 of the film 8 that are situated on either side of the top wire 2 and above the spreader arms 7 have through orifices 14 in the upper parts thereof, enabling the vines inside the film to be ventilated, as described below.

In the example described, the orifices 14 are circular, having a diameter of about 1 cm, and they are disposed in rows that are parallel to the long direction of the film 8.

By way of example, there may be about thirty orifices 14 per row and per linear meter, and there are thirty-four in the particular example shown. The number of rows may depend on the width of the film.

As an indication, the number of rows per panel of the film may be selected to be equal to five, for example, when the film is 1.6 m wide, and may be selected to be equal to six when the film is 2 m wide, and may be selected to be equal to seven when the film is 2.4 m wide.

The distance between two adjacent rows may be about 4 cm, for example.

With the values given above, the total sectional area of the orifices 14, per panel of film and per linear meter, may lie in the range 133 $cm^2$ to 187 $cm^2$.

Naturally, the orifices can be presented in a manner other than that described above without going beyond the ambit of the invention, but the orifices must nevertheless be of dimensions that are small enough for the film 8 to remain effective against cold and rain.

The width L of the perforated zone in each panel of the film may be 19 cm, for example, when there are five rows of orifices, and the top edge of said perforated zone may be about 18 cm from the top wire, for example.

In the example described and for each stake 1, the means 3 for holding the top wire 2 are constituted by a sleeve 16 that is longitudinally slotted in its top portion so as to enable the wire to be engaged inside the sleeve via said slot. The sleeve 16 is supported by a vertical bar 17 having its bottom end engaged in a channel-section member 18 fixed vertically on the stake 1.

The bar 17 is secured to the section member 18 at the desired height, e.g. by means of a screw engaging in orifices 19 formed at intervals along the bar 17 and selected as a function of the height at which it is desired to place the top wire 2.

The spreader arms 7 can be held in place by any known means, in a position where they extend substantially horizontally as shown in FIGS. 2 and 3 so as to spread apart the lateral wires 5 together with the two panels of the film 8.

The spreader arms 7 can be folded down when the film 8 is removed.

The length of each spreader arm is about 30 cm, for example.

The lateral support wires are held by longitudinally slotted sleeves 22 analogous to the above-described sleeve 16.

In this way, it is possible to use traditional support wires as the lateral wires, which wires are fixed in position on the vines and serve to push back against the vines any shoots tending to grow away from the row.

The film 8 is put into place shortly before new growth starts, so that the bottom edges 11 of the film 8 are slightly above the lowest height at which side shoots develop and so as to leave an opening between the bottom edges 11 that is large enough to enable the vines to be ventilated by a flow of air entering the space left between the bottom edges 11 and exiting via the orifices 14. The elastic straps 9 are fixed to the hooks 12, as shown in FIGS. 1 and 2.

As an indication, the spacing between the end edges 11 may lie in the range 20 cm to 50 cm.

The height of the end edges 11 above the ground during this step of the method depends on the nature of the vines and on the way in which they have been pruned.

Surprisingly, it has been found that the presence of the orifices 14 makes it possible to obtain relatively high speeds of air flow in the vicinity of the vegetation beneath the film 8, with speeds of the order of 5 km/h, thereby avoiding excessive heating of the air inside the film while not depriving the film of its protective role against frost.

It will be observed that in spite of the film 8 being used, and in spite of the spreader arms 7, sufficient space remains between the rows of vines for people to pass between them and also for a vineyard tractor to pass between them.

The film 8 can be removed once the risk of frost is over, but in accordance with the invention, it is advantageous to keep the film in place until the end of the fruiting process, which has the advantage of avoiding any need during this period to perform treatments against diseases of the vine, and of ensuring that fruiting takes place properly without leading to abortion or to uneven ripening.

This method of the invention also brings on the vegetative process by one or two weeks which is particularly useful for late varieties.

After vines have been grown normally without film up to the beginning of ripening, it is advantageous to put the film 8 back into place after raising the top support wire 2 and, where necessary, raising the spreader arms 7.

As an indication, the top wire 2 can be raised by 20 cm, for example, by acting on the fixing between the bar 17 and the channel section member 18.

Thereafter, the film 8 is placed on the wires 2 and 5 while ensuring that the bottom edges 11 of the film are at a level that is perceptibly higher than the grapes R, as shown diagrammatically in FIG. 3. The elastic straps 9 are attached to the hooks 13.

In this way, the grapes are exposed directly to sunlight and leaves can be removed from the vines to accelerate ripening of the grapes.

Figure 4:
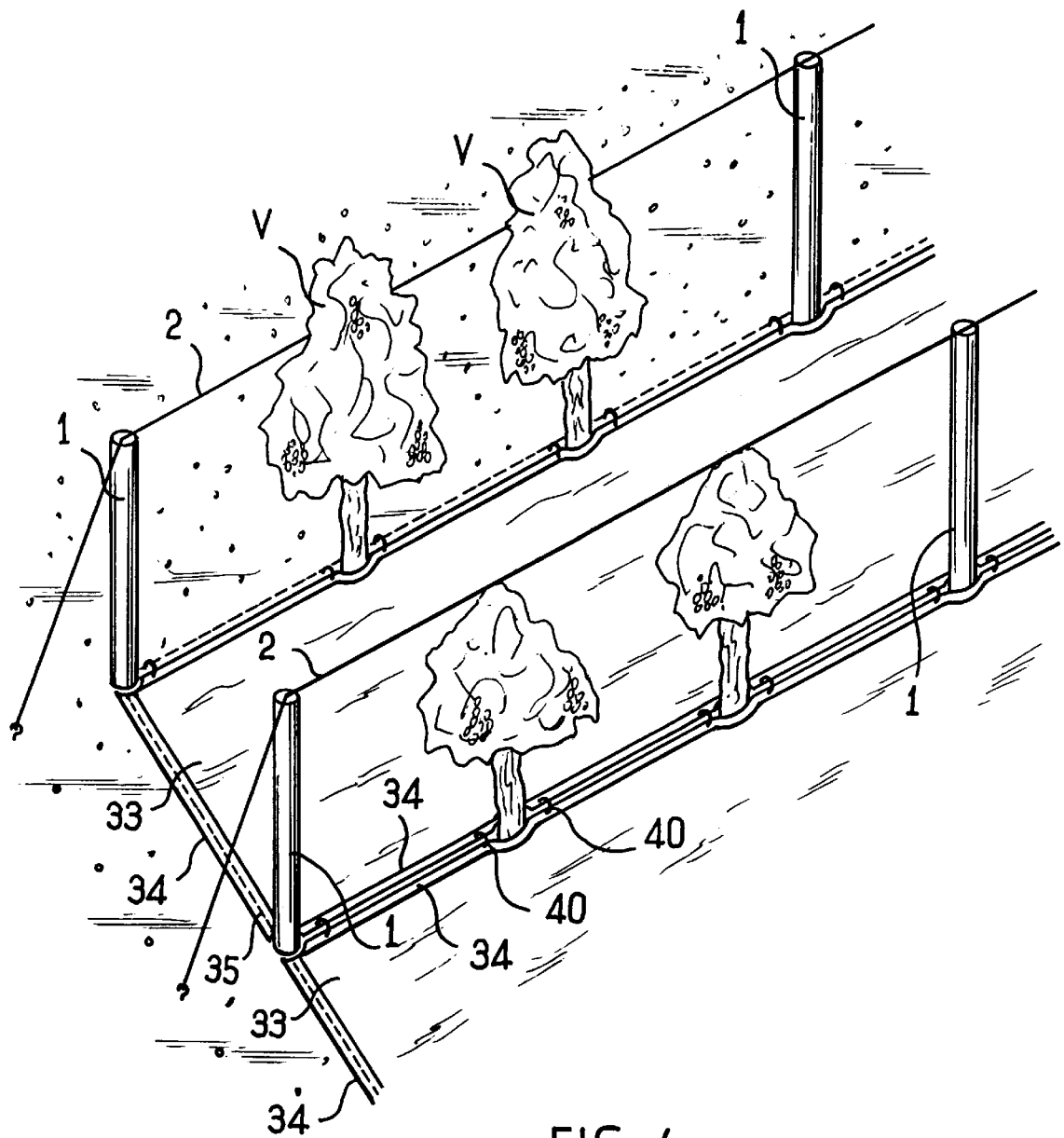
FIG. 4 is a diagrammatic perspective view showing how strips of waterproof film are put into place on the ground between rows of vines.

Advantageously, during the period following the beginning of ripening and preceding vintaging, strips 33 of waterproof film are also laid between the rows of vines to remove water to the ends of the rows and prevent it from penetrating into the ground, as illustrated in FIG. 4.

The strips 33 are advantageously put into place while the film 8 is protecting the vines, as explained above.

The width of the strips 33 is substantially equal to the distance between two rows of stakes in two adjacent rows of vines, and the strips are put into place by being unrolled on the ground between the rows of vines.

The strips 33 are provided on all four edges with reinforcing hems 34.

Cords 35 shown diagrammatically in FIG. 4 can be engaged inside the hems 34 that extend across the width of the strips 33 and that are fixed to the stakes at the ends of the rows of vines.

Figure 5:
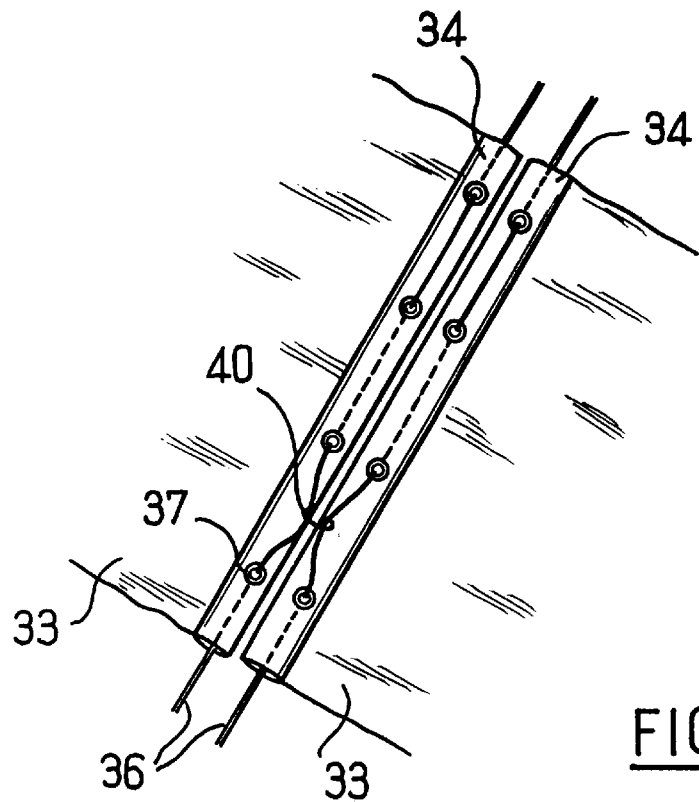
FIG. 5 shows one way of fastening two adjacent strips of film together.

The strips 33 are also connected to one another in pairs by fasteners 40, as shown in FIG. 5.

In the embodiment described, these fasteners 40 hook onto cords 36 which extend parallel to the rows of vines and which are tensioned between the end stakes of the rows of vines.

In the example described, the hems 34 that extend along the length of the strips are pierced at intervals by eyelets 37 through which the cords 36 are engaged so as to hold the strips 33 pressed down against the ground.

Naturally, other known means may be provided for holding the strips on the ground and for fastening adjacent strips together.

When used during the ripening stage, the method of the invention has the advantage of protecting the grapes against excess moisture by protecting them against rain, and of avoiding excess ground moisture causing sap to rise, thereby bursting the grapes.

The method of the invention thus makes it possible to achieve a vintaging of better quality, at an earlier date, protected from weather hazards, and while also requiring less treatment against disease.

Naturally, the invention is not limited to the description above.

Figure 6:
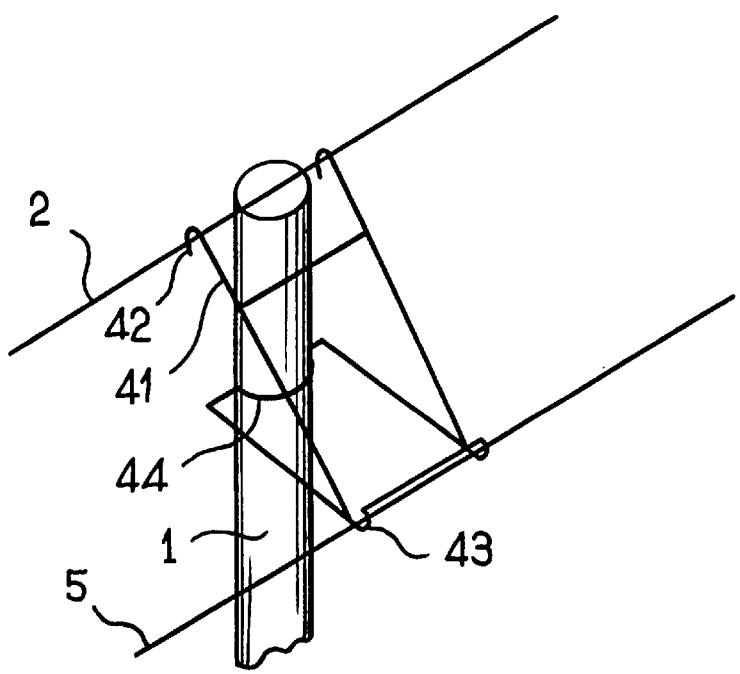
FIG. 6 shows a variant embodiment of a member for holding a lateral wire.

In particular, it is possible to use various means for holding the top and lateral wires, and, for example, to use a support 41 for supporting each lateral wire as shown in FIG. 6, which support has two top hooks 42 that engage on the top wire 2 and has a bottom portion with one end 44 that has a curved shape adapted to rest against the stake. The bottom portion of the support 41 remote from its end 44 bearing against the stake 1 has two hooks 43 on which a lateral wire 5 is engaged. Such a support 41 can be made of steel wire, for example.

I claim:

1. A method of growing one row of vines so as to avoid frost damage and to promote good fruiting, said method comprising:

placing a wire along the top of a row of stakes arranged along said row of vines;

draping a plastic film over said wire and said vines shortly before new vine growth starts, said wire dividing said film into first and second panels arranged on each side of each row of vines, each said panel having a free edge;

spreading said panels using spreader elements, said spreader elements dividing each said panel into a top portion, disposed between said wire and said spreader elements, and a bottom portion, at least one said top portion being perforated with orifices to enable said vines to be ventilated;

securing said film by fastening said free edges so that they are substantially level with and below the lowest height at which side shoots of said vines develop, said fastened edges being separated from each other and spaced from the ground so as to allow air to ventilate said vines; and leaving said film in place at least until any risk of frost ends.

2. The method according to claim 1, wherein said film is left in place until after the fruiting period so as to enable fruiting to take place under favorable circumstances.

3. The method according to claim 1, wherein said orifices are perforated in each panel of said film.

4. The method according to claim 3, wherein said orifices are perforated in parallel rows, each said row containing about thirty orifices per linear meter of film.

5. The method according to claim 4, wherein the width of said film is about 1.6 m, said film is perforated with five parallel rows of orifices on each panel.

6. The method according to claim 4, wherein the width of said film is about 2 m, said film is perforated with six parallel rows of orifices on each panel.

7. The method according to claim 4, wherein the width of said film is about 2.4 m, said film is perforated with seven parallel rows of orifices on each panel.

8. The method according to claim 1, wherein said film is secured by elastic straps.

9. A structure for protecting vines from frost constructed in accordance with the method of claim 1.

10. The structure as in claim 9, further comprising adjustable height support means for supporting said wire.

11. A method of facilitating grape ripening on a row of vines after the vines have been grown to the beginning of ripening without being covered by a film, said method comprising:
- placing a wire along the top of a row of stakes arranged along said row of vines, said vines having leaves;
- raising the wire to a level above the leaves of the vines;
- draping a plastic film over said wire and said leaves, said wire dividing said film into first and second panels, each said panel having a free edge;
- spreading said panels using spreader elements, said spreader elements dividing each said panel into a top portion, disposed between said wire and said spreader elements, and a bottom portion,
- at least one said top portion being perforated with orifices to enable said vines to be ventilated;
- securing said film by fastening said free edges so that they are substantially level with and above the level of grapes on the vines; and
- removing said film immediately before vintaging.

12. The method according to claim 11, wherein a second plastic film is placed on the ground, said second film extending between the rows of vines to remove water to the ends of the rows to prevent the water from penetrating into the ground.

13. The method according to claim 11, wherein said film is secured by elastic straps.

14. A structure for facilitating grape ripening constructed in accordance with the method of claim 11.

15. The structure as in claim 14, further comprising adjustable height support means for supporting said wire.

16. The structure as in claim 14, further comprising a second plastic film placed on the ground, said second film extending between the rows of vines to remove water to the ends of the rows.

17. A method of growing a row of vines so as to avoid frost damage and to promote good fruiting, said method comprising:
- placing a wire along the top of a row of stakes arranged along said row of vines;
- draping an integral plastic film over said wire and said vines shortly before new vine growth starts, each said wire dividing said film into first and second panels arranged on each side of said row of vines, each said panel having a free edge;
- spreading said panels using spreader elements, said spreader elements dividing each said panel into a top portion, disposed between said wire and said spreader elements, and a bottom portion,
- at least one said top portion being perforated with orifices distributed only on said top portions of said panels to enable said vines to be ventilated;
- securing said film by fastening said free edges so that they are substantially level with and below the lowest height at which side shoots of said vines develop, said fastened edges being separated from each other and spaced from the ground so as to allow air to ventilate said vines; and
- leaving said film in place at least until any risk of frost ends.

18. A method of facilitating grape ripening on a row of vines after the vines have been grown to the beginning of ripening without being covered by a film, said method comprising:
- placing a wire along the top of a row of stakes arranged along said row of vines, said vines having leaves;
- raising the wire to a level above the leaves of the vines;
- draping an integral plastic film over said wire and said leaves, said wire dividing said film into first and second panels, each said panel having a free edge;
- spreading said panels using spreader elements, said spreader elements dividing each said panel into a top portion, disposed between said wire and said spreader elements, and a bottom portion,
- at least one said top portion being perforated with orifices distributed only on said top portion of said panels to enable said vines to be ventilated;
- securing said film by fastening said free edges so that they are substantially level with and above the level of grapes on the vines; and
- removing said film immediately before vintaging.

19. A method of growing one row of vines so as to avoid frost damage and to promote good fruiting, said method comprising:
- placing a wire along the top of a row of stakes arranged along said row of vines;
- draping a plastic film over said wire and said vines shortly before new vine growth starts, said wire dividing said film into first and second panels arranged on each side of said row of vines, each said panel having a free edge;
- spreading said panels using spreader elements, said spreader elements dividing each said panel into a top portion, disposed between said wire and said spreader elements, and a bottom portion,
- at least one said top portion being perforated with orifices having a total area of from 100 $cm^2$ to 1000 $cm^2$ per linear meter of film to enable said vines to be ventilated;
- securing said film by fastening said free edges so that they are substantially level with and below the lowest height at which side shoots of said vines develop, said fastened edges being separated from each other and spaced from the ground so as to allow air to ventilate said vines; and
- leaving said film in place at least until any risk of frost ends.

20. The method according to claim 19, wherein said perforations form each said orifice with a diameter of about 1 cm.

21. A method of growing one row of vines so as to avoid frost damage and to promote good fruiting, said method comprising:
- placing a wire along the top of a row of stakes arranged along said row of vines;
- draping a plastic film over said wire and said vines shortly before new vine growth starts, said wire dividing said film into first and second panels arranged on each side of said row of vines, each said panel having a free edge;
- spreading said panels using spreader elements, said spreader elements dividing each said panel into a top portion, disposed between said wire and said spreader elements, and a bottom portion,
- at least one said top portion being perforated with orifices having a total area of from 200 $cm^2$ to 500 $cm^2$ per linear meter of film to enable said vines to be ventilated;
- securing said film by fastening said free edges so that they are substantially level with and below the lowest height at which side shoots of said vines develop, said fastened edges being separated from each other and spaced from the ground so as to allow air to ventilate said vines; and
- leaving said film in place at least until any risk of frost ends.

* * * * *